United States Patent [19]
Fukuda et al.

[11] 4,088,434
[45] May 9, 1978

[54] DIE FOR CONTINUOUSLY EXTRUDING HOLLOW ARTICLES FROM THERMOSETTING RESINS

[75] Inventors: Yoshihiko Fukuda, Kure; Hidefumi Ishimori, Hiroshima; Masafumi Toyomatsu, Kohnan; Masayoshi Tsubone, Kawanishi; Hideki Mizuguchi; Hideo Masuda, both of Hiroshima, all of Japan

[73] Assignees: The Japan Steel Works Ltd., Tokyo; Dai Nippon Toryo Co., Ltd., Osaka, both of Japan

[21] Appl. No.: 763,804

[22] Filed: Jan. 17, 1977

Related U.S. Application Data

[63] Continuation of Ser. No. 605,244, Aug. 18, 1975, abandoned.

[51] Int. Cl.² .......................................... B29D 23/04
[52] U.S. Cl. .................................. 425/467; 264/209; 425/379 R; 425/380
[58] Field of Search .................. 425/379 R, 467, 380, 425/379 S, 378 R, 466, 381; 264/209; 72/264, 269

[56] References Cited

U.S. PATENT DOCUMENTS

| 2,742,669 | 4/1956 | Rhodes ........................... 425/379 X |
| 3,385,917 | 5/1968 | Breukink et al. ............. 425/379 R X |
| 3,393,427 | 7/1968 | Larsen ................................. 425/379 |
| 3,609,809 | 10/1971 | Slicker ....................... 425/379 R X |
| 3,822,977 | 7/1974 | Hinrichs ..................... 425/379 R X |

Primary Examiner—Francis S. Husar
Assistant Examiner—Mark Rosenbaum
Attorney, Agent, or Firm—Larson, Taylor and Hinds

[57] ABSTRACT

A die for continuously extruding hollow articles from thermosetting resins comprises an outer cylinder and an inner cylinder arranged coaxially with an annular gap left between them for the passage of resin, both cylinders being adjusted so as to be cooled at their upstream portions and heated at their downstream portions relative to the flow of extrusion.

4 Claims, 2 Drawing Figures

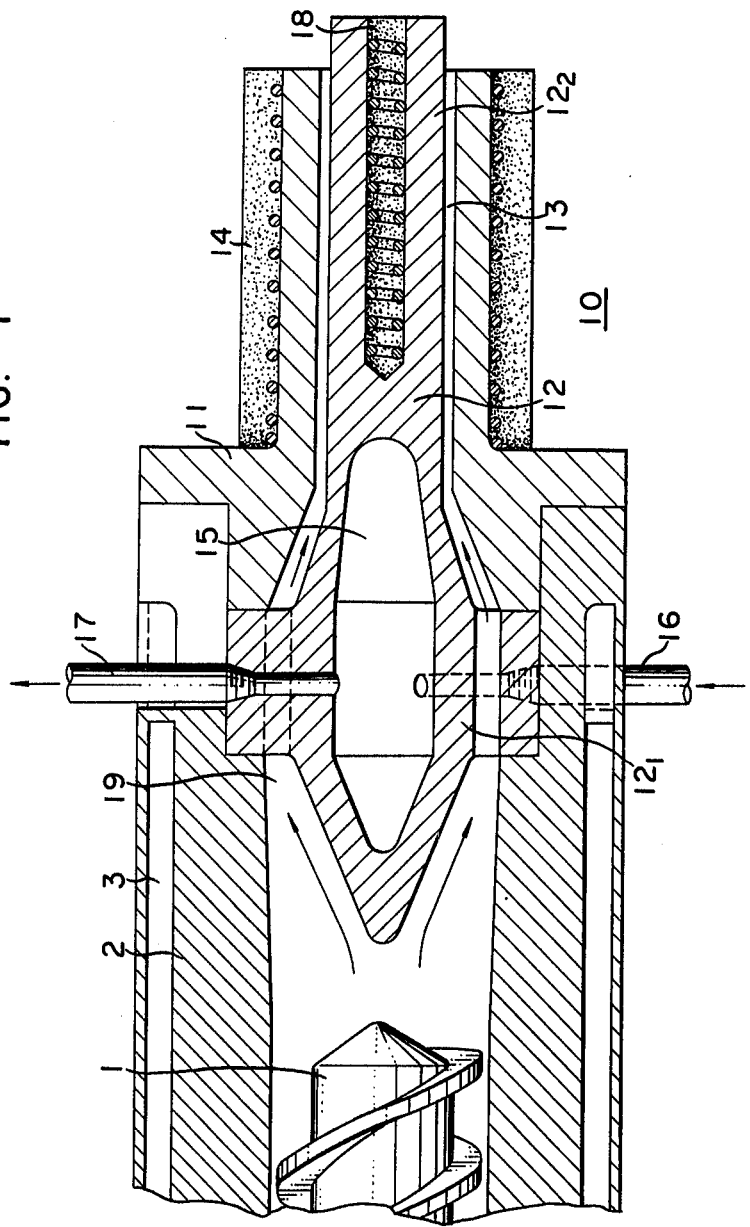

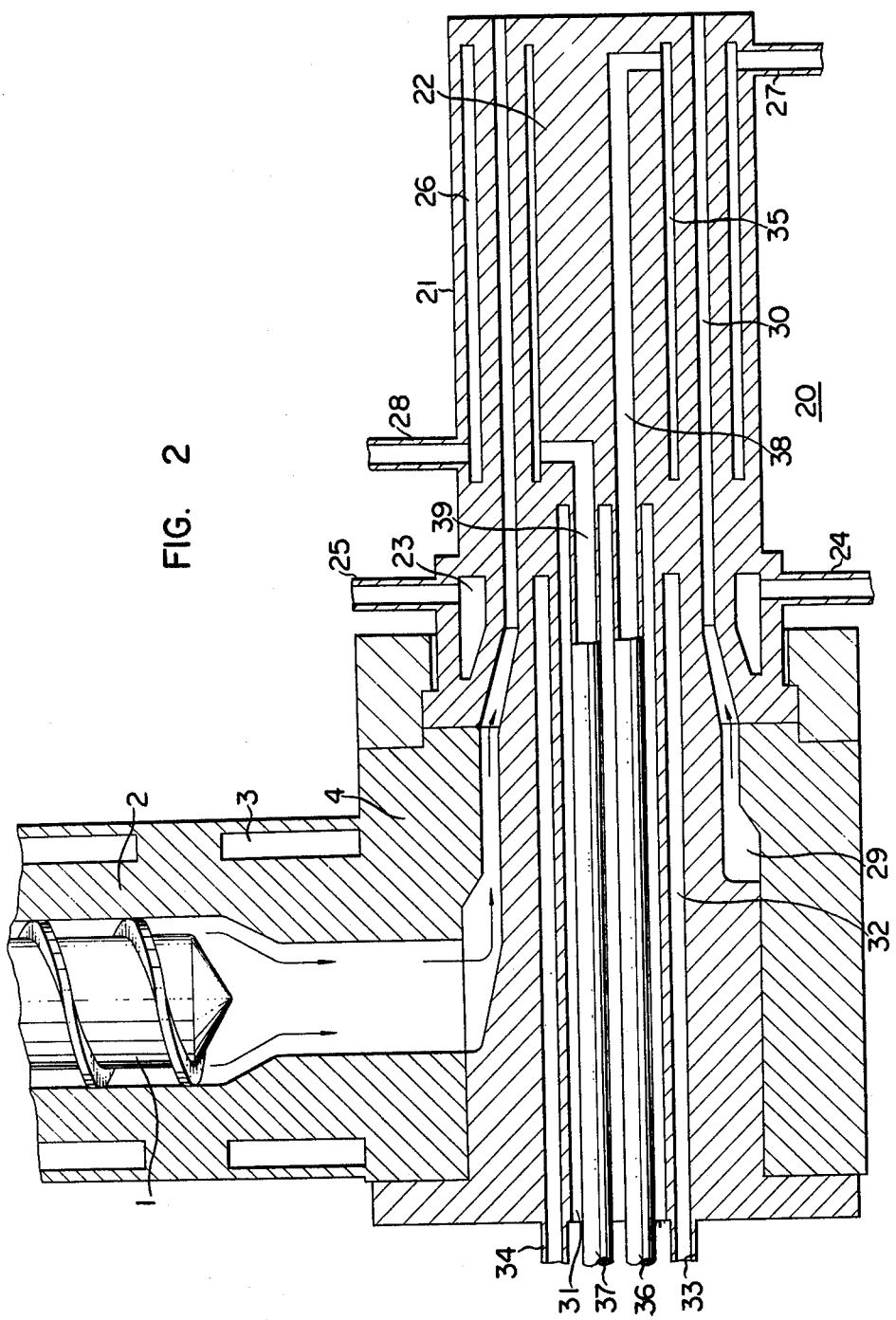

DIE FOR CONTINUOUSLY EXTRUDING HOLLOW ARTICLES FROM THERMOSETTING RESINS

This is a continuation of application Ser. No. 605,244 filed Aug. 18, 1975, now abandoned.

BACKGROUND OF THE INVENTION

The present invention relates to a die, and more particularly to a die for continuously extruding hollow articles, such as pipe, from thermosetting resins.

Pipes made of thermosetting resins have been previously used only within a relatively narrow field notwithstanding their superior properties. The reasons for this primarily pertain to the absence of suitable shaping apparatuses at the present time, and the relatively late development of uses for these resins. However, owing to the recent development of their uses it has become increasing important to devise apparatuses for extruding hollow articles from thermosetting resins at a relatively low cost.

Although the process of continually extruding pipe from thermoplastic resins had been know, it was very difficult to continuously extrude pipes, etc. from thermosetting resins due to their specific properties. Thermosetting resins become self-heated during the process of continuous extrusion through a die whose temperature is above their setting temperature so that a premature curing of the resins occurs at a deep point within the die and further extrusion is prevented.

Thus, the continuous extrusion of hollow articles, such as pipe, from thermosetting resins could only be carried out at a relatively low speed, and their costs were necessarily high.

SUMMARY OF THE INVENTION

It is one object of the present invention to provide a die suitable for continuously extruding hollow articles from thermosetting resins at a high speed.

Another object of the present invention is to provide a die suitable for extruding hollow articles from thermosetting resins which will permit free adjustment of the temperature of the resins in order to obtain extruded hollow articles of an excellent quality.

According to the present invention a die for continuously extruding hollow articles from thermosetting resins is provided which comprises an outer cylinder and an inner cylinder disposed coaxially so as to form an annular passage between them for the extrusion of resins, the die being adapted to be cooled at the upstream portion and heated at the downstream portion relative to the flow of extrusion.

One aspect of the present invention is that the die will be cooled by the circulation of a cooling medium through cooling jackets provided in the inner cylinder.

A second aspect of the present invention is that the die will be heated by heating wires surrounding the outer cylinder or contained in the inner cylinder.

Another aspect of the present invention is that the die will be heated by the circulation of heating media through heating jackets provided in the outer and inner cylinders.

BRIEF DESCRIPTION OF THE DRAWINGS

These and other objects of the present invention will become more apparent upon reading the following specification and referring to the accompanying drawings, wherein:

FIG. 1 is an elevational sectional view of one embodiment of the present invention; and FIG. 2 is an elevational sectional view of another embodiment of the present invention.

DESCRIPTION OF THE PREFERRED EMBODIMENTS

In FIG. 1 of the drawings which exhibits one embodiment of the present invention, there is shown a conventional extruder comprising a screw 1, a barrel 2 and a jacket 3 which surrounds barrel 2 to cool it.

According to the present invention, a die 10 is detachably mounted by suitable means to the discharge end of barrel 2 but such means are not presented in FIG. 1 which is for extruding pipe. Die 10 is main composed of an outer cylinder 11 and an inner cylinder 12 which is introduced into the hollow cylindrical space of outer cylinder 11 so that an annular cylindrical gap 13 is left between the inner and outer cylindrical surfaces of outer and inner cylinders 11, 12, respectively. The dimension of gap 13 substantially corresponds to the thickness of the pipe to be extruded.

Outer cylinder 11 is provided with heating means 14 of any known type, such as electrical wires, around its outer periphery. Inner cylinder 12 is composed of two parts, an upstream part $12_1$ and a downstream part $12_2$, which may be integrally or detachably connected by any suitable means such as by screwing.

The upstream part $12_1$ which is adapted to be mounted in the discharge orifice of barrel 2, has a substantially ellipsoid configuration with a larger outer diameter than the downstream part $12_2$ which is adapted to be received in the inner cylindrical space of outer cylinder 11 and has a substantially cylindrical configuration so as to leave the said gap 13 between the inner cylindrical surfaces of outer cylinder 11. Further, upstream part $12_1$ has formed in its interior portion a cooling jacket 15 designed to circulate a cooling medium such as water through an inlet nozzle 16 and an exit nozzle 17. Both nozzles 16 and 17 are fixedly secured to the body of upstream part $12_1$ at its mid portion so as to vertically align each other.

Downstream part $12_2$ is axially bored from the downstream end and fitted with electric wires 18.

The first embodiment of the present invention is the construction described above; in operation, thermosetting resins are continuously discharged from barrel 2 by the revolution of screw 1 and shaped into pipe when they are forcedly extruded firstly through a gap 19 formed between the inner walls of barrel 2 and the outer periphery of upstream part $12_1$ of die 12 and successively through gap 13 formed between the outer cylindrical surface of downstream part $12_2$ of inner cylinder 12 and the inner cylindrical surfaces of outer cylinder 11.

In this case, the premature setting of the thermosetting resins caused by their spontaneous generation of heat when passing through gap 19, formed between the inner surfaces of barrel 12 and the outer periphery of upstream part $12_1$ can be effectively prevented by cooling the upstream part $12_1$ of inner cylinder 12 by the circulation of a cooling medium in jacket 15. However, the setting of the thermosetting resins as they pass through gap 13 formed between the inner cylindrical surfaces of outer cylinder 11 and the outer cylindrical surfaces of downstream part $12_2$ of inner cylinder 12 can be effected by heating outer cylinder 11 and downstream part 12₂ of inner cylinder 12 by means of electrical wires 14 and 18, respectively.

In FIG. 2 of the drawings wherein another embodiment of the present invention is exhibited, there is shown a conventional extruder disposed vertically which is composed of a screw 1, a barrel 2, provided with a surrounding jacket, and a die holder 4, integrally or separately formed at the discharge end of barrel 2. Detachably secured to die holder 4 by suitable means is a die 20 which according to the present invention is principally composed of an outer cylinder 21 and an inner cylinder 22 coaxially disposed within it, so that the center line of both cylinders 21 and 22 meets that of the extruder at right angles.

A cooling jacket 23 provided in the wall of the upstream portion of outer cyinder 21 (relative to the flow of extrusion) located a short distance from the neighborhood of the upstream area is to receive a cooling medium, such as water, from cooling medium inlet 24 and discharge it through a cooling medium exit 25. Inlet 24 and exit 25 are opened into jacket 23 substantially at right angles to the center line of outer cylinder 21 and in aligning relation. Further, outer cylinder 21 is provided with a heating jacket 26 at its downstream portion in the wall, starting near the downstream end of cooling jacket 23, over a substantial axial length. Heating jacket 26 is designed to circulate a heating medium, such as heated oil, which is fed into heating jacket 26 through a heating medium inlet 27 opened in the wall of the underside of outer cylinder 21 near its downstream end, and discharged through a heating medium exit 28 opened in the wall of outer cylinder 21 at its upper side, near cooling medium exit 25.

In this case, a substantial axial distance must separate the confronting ends of cooling jacket 23 and heating jacket 26 in order to ensure heat insulation between both jackets 23 and 26.

Inner cylinder 22 has substantially a cylindrical configuration which is received between the horizontal bore of die holder 4 at the upstream portion and the inner cylindrical space of outer cylinder 21 at the downstream portion. In this case, the outer diameter of inner cylinder 21 at its upstream position has been made larger for a substantial length than the downstream portion so that it will fit snugly in the corresponding bore of die holder 4. At the inner end of the larger diameter, the outer diameter of inner cylinder 22 is decreased so as to form an annular passage 29 for resins passing between it and the bore having a reduced inner diameter of die holder 4. Accordingly, the outer diameter of inner cylinder 22 is gradually reduced to form a cylindrical surface having a constant diameter so that there is formed an annular cylindrical resin passage 30 between it and the inner cylindrical surface of outer cylinder 21.

Inner cylinder 22 is further provided with a central bore 31 which has a substantial inner diameter at its upstream portion. This central bore 31 extends nearly up to the downstream end of cooling jacket 23 in outer cylinder 21. Inner cylinder 22 is also provided with a cooling jacket 32 which surrounds central bore 31 over substantially its whole length. Cooling jacket 32 is designed to circulate a cooling medium, such as water, which is supplied through a cooling medium inlet 33 and discharged through a cooling medium exit 34. Both inlet 33 and 34 are opened into cooling jacket 32 at the upstream end of inner cylinder 22. Inner cylinder 22 is further provided with an annular heating jacket 35 at the downstream portion over a substantial axial length. Heating jacket 35 circulates a heating medium, such as heated oil, which is supplied through a heating medium inlet pipe 36 and discharged through a heating medium outlet pipe 37. Pipes 36 and 37 are disposed in central bore 31 in the axial direction to be connected to inner cylinder 22 at the bottom of central bore 31. The heating medium supplied through inlet pipe 36 to the bottom of central bore 31 is supplied to the downstream end of heating jacket 35 through a suitable passage 38 drilled in the body of inner cylinder 22 and discharged at the upstream end of heating jacket 35 into heating medium outlet pipe 37 through a suitable passage 39 drilled in the body of inner cylinder 22 down to the bottom of central bore 31.

In this connection, it will be appreciated that in the second embodiment of the present invention heating jacket 26 and 35 provided in outer and inner cylinders 21 and 22, respectively, are filled with the heating medium in a counter flow fashion relative to the flow direction of the thermosetting resins to be extruded through annular passages 29 and 30 formed between the inner and outer cylindrical surfaces of outer and inner cylinders 21 and 22, respectively. Accordingly, heat will be effectively transferred to the thermosetting resins to be extruded through annular resin passages 29 and 30 from the heating medium flowing through jackets 26 and 35.

In the case of the second embodiment the thermosetting resins continuously discharged from barrel 2 of the extruder by the action of rotating screw 1 are fed into annual passage 29 of die holder 4 formed between its bore and the outer surface of inner cylinder 22 of die 20. In this case, the premature setting of the resins due to their self generation of heat can be effectively prevented by circulating a cooling medium through cooling jacket 32 of inner cylinder 22 of die 20.

The resins successively entering the upstream portion of outer cylinder 21 of die 20 will be cooled by the cooling medium circulated through cooling jacket 23 of outer cylinder 21. When the extruded resins pass further through annular resin passage 30 formed between the inner and outer cylindrical surfaces of outer and inner cylinders 21 and 22, respectively, of die 20 at a substantial downstream position, they are heated by the heating medium circulating through heating jackets 26 and 35 of outer and inner cylinders 21 and 22, respectively, and cured so that the desired hollow articles can be obtained through die 20 at the end of the extrusion.

In this case, it will be appreciated that since the cooling medium and the heating medium are circulated in the same outer or inner cylinder 21 or 22, respectively, or closely each other, their jackets such as 23, 26 of outer cylinder 21 or 32, 35 of inner cylinder 22 should be sufficiently spaced in the axial direction, and inlet and outlet pipes 36 and 37 for circulating the heating medium in heating jacket 35 of inner cylinder 22 should be sufficiently spaced from the inner surface of central bore 31.

The temperature of the cooling and heating part of the die can be controlled very easily by the temperature of the cooling or heating medium supplied to the cooling or heating jackets.

One of the advantages which the second embodiment has over the first is that inner cylinder 22 can be given a larger quantity of heat. In the first embodiment, it is generally difficult to install electric wires having a large capacity, especially within inner cylinder 12. However, in the second embodiment, heating jacket 26 or 35 is heated by a heating medium. Therefore, the second embodiment is more suitable for continuously extruding at a higher speed hollow articles of a larger dimension, such as pipes, from thermosetting resins.

Another advantage of the second embodiment is that it allows for a more precise control of temperature because it is heated by a heating medium which has a larger elasticity.

It is to be understood that although certain forms of this invention have been illustrated and described, it is not to be limited thereto except insofar as such limitations are included in the following claims:

We claim:

1. A die for continuously extruding hollow articles from thermosetting resins comprising:

an elongate outer cylinder having a smooth inner surface;

an elongate inner cylinder having a smooth outer surface disposed coaxially within said outer elongate cylinder and forming therebetween an unobstructed annular extrusion passage between the smooth outer surface of said inner cylinder and the smooth inner surface of said outer cylinder, said outer and inner cylinders each having upstream portions forming an upstream end of said die for receiving thermosetting resins from an extruder barrel, said outer and inner cylinders each having downstream portions forming a downstream end of said die for discharging a hollow thermosetting resin extrudate;

first cooling means for cooling the upstream portion of said outer cylinder comprising a first coolant fluid conduit in the upstream portion of said outer cylinder;

second cooling means for cooling the upstream portion of said inner cylinder comprising a second coolant fluid conduit in the upstream portion of said inner cylinder;

first heating means for heating the downstream portion of said outer cylinder comprising a first heating fluid conduit in the downstream portion of said outer cylinder, said first heating fluid conduit being axially spaced from said first cooling fluid conduit; and second heating means for heating the downstream portion of said inner cylinder comprising a second heating fluid conduit in the downstream portion of said inner cylinder, said second heating fluid conduit being axially spaced from said second cooling fluid conduit, said die further including means operatively associated with said die for securing said die to an extruder having an extruder barrel such that said outer and inner cylinders are disposed at right angles to the extruder barrel said first and second heating fluid conduits having inlets so located that the respective conduits are filled with heating medium in a counter flow fashion relative to the flow direction of such thermosetting resins to be extruded.

2. A die as claimed in claim 1 wherein first and second cooling means comprise first and second cooling jackets formed by annular coolant fluid carrying chambers and said first and second heating means comprise first and second heating jackets formed by annular heating fluid carrying chambers.

3. A die as claimed in claim 2 wherein said first and second cooling jackets and said first and second heating jackets are coaxial.

4. A die according to claim 1 wherein the upstream end of said inner cylinder includes a bore and wherein said second heating means comprises a heating fluid inlet pipe and a heating fluid outlet pipe extending through said bore, said inlet and outlet pipe being spaced from the wall of said bore to prevent heat transfer between said inlet and outlet pipes and said second cooling means.

* * * * *